(12) United States Patent
Dilger et al.

(10) Patent No.: US 10,819,653 B2
(45) Date of Patent: Oct. 27, 2020

(54) CONTROL UNIT AND METHOD FOR OPERATING AN INDUSTRIAL AUTOMATION SYSTEM COMMUNICATION NETWORK COMPRISING A PLURALITY OF COMMUNICATION DEVICES

(71) Applicant: Siemens Aktiengesellschaft, Munich (DE)

(72) Inventors: Marco Dilger, Bühlertal (DE); Amine Mohamed Houyou, Jersey City, NJ (US); Johannes Riedl, Ergolding (DE); Andreas Zirkler, Münich (DE)

(73) Assignee: Siemens Aktiengesellschaft, Munich (DE)

(*) Notice: Subject to any disclaimer, the term of this patent is extended or adjusted under 35 U.S.C. 154(b) by 0 days.

(21) Appl. No.: 16/474,922

(22) PCT Filed: Dec. 29, 2016

(86) PCT No.: PCT/EP2016/082831
§ 371 (c)(1),
(2) Date: Jun. 28, 2019

(87) PCT Pub. No.: WO2018/121864
PCT Pub. Date: Jul. 5, 2018

(65) Prior Publication Data
US 2019/0327181 A1    Oct. 24, 2019

(51) Int. Cl.
*H04L 12/911* (2013.01)
*G05B 19/418* (2006.01)
(Continued)

(52) U.S. Cl.
CPC ......... *H04L 47/72* (2013.01); *G05B 19/4185* (2013.01); *H04L 41/0803* (2013.01);
(Continued)

(58) Field of Classification Search
CPC . H04L 47/2441; H04L 47/2483; H04L 47/72; H04L 47/781; H04L 47/782;
(Continued)

(56) References Cited

U.S. PATENT DOCUMENTS

| 2007/0133409 A1* | 6/2007 | McKinnon, III | H04L 47/824 370/230 |
| 2013/0268686 A1 | 10/2013 | Wang et al. | |

(Continued)

FOREIGN PATENT DOCUMENTS

| DE | 102014219472 | 3/2016 |
| WO | WO2013/110742 | 8/2013 |

(Continued)

OTHER PUBLICATIONS

Schweissguth Eike et al:"Application-aware industrial ethernet based on an SDN-supported TDMA approach", 2016 IEEE World Conference on Factory Communication Systems (WFCS), IEEE, pp. 1-8, XP032915554, DOI: 10.1109/WFCS.2016.7496496; [gefunden am Jun. 20, 2016]; paragraph [III.] ; fig. 1., 3.; 2016.

(Continued)

*Primary Examiner* — Pao Sinkantarakorn
*Assistant Examiner* — Pawaris Sinkantarakorn
(74) *Attorney, Agent, or Firm* — Cozen O'Connor

(57) ABSTRACT

Method for operating an industrial automation system communication network that includes a plurality of communication devices, and control unit, wherein at least one control unit controls functions of a plurality of assigned communication devices and is assigned to at least one partition of the communication network in order to operate an industrial automation system communication network comprising a plurality of communication devices, where partitions each include predefinable parts of communication devices assigned to system resources for predefinable resource peri- (Continued)

ods of use, access periods and repetition cycles for transmit queues are set by the control unit according to the resource periods of use for the partitions in the assigned communication devices, where possible partitions are determined for the path reservation requests based on matching classifications of access periods and repetition cycles, and where the particular path reservation request is assigned to a determined partition when sufficient system resources exist.

16 Claims, 3 Drawing Sheets

(51) Int. Cl.
H04L 12/24 (2006.01)
H04L 12/751 (2013.01)
(52) U.S. Cl.
CPC .... *H04L 45/02* (2013.01); *G05B 2219/31368* (2013.01); *G05B 2219/33136* (2013.01)
(58) Field of Classification Search
CPC ................ H04L 47/826; H04L 47/828; G05B 19/4185–4186
See application file for complete search history.

(56) References Cited

U.S. PATENT DOCUMENTS

2014/0372617 A1 12/2014 Houyou et al.
2017/0302587 A1 10/2017 Houyou et al.
2017/0339109 A1* 11/2017 Zeng ................ G05B 19/41855

FOREIGN PATENT DOCUMENTS

WO WO2014/108178 7/2014
WO WO2015/096761 7/2015

OTHER PUBLICATIONS

Huang Vin-Fu et al: "Radio resource management for a mobile network with TD-CDMA", Emerging Technologies: Frontiers of Mobile and Wireless Communication, 2004. Proceedings of the IEEE 6th Circuits and Systems Symposium, Piscataway, NJ, USA, IEEE, pp. 73-76, XP010716016, DOI: 10.1109/CASSET.2004. 1322920; ISBN: 978-0-7803-7938-1 paragraph [II.DL [III.AL [III. BL [III.D]; 2004.
PCT International Search Report and Written Opinion of International Searching Authority dated Sep. 28, 2017 corresponding to PCT International Application No. PCT/EP2016/082831 filed Dec. 29, 2016.

* cited by examiner

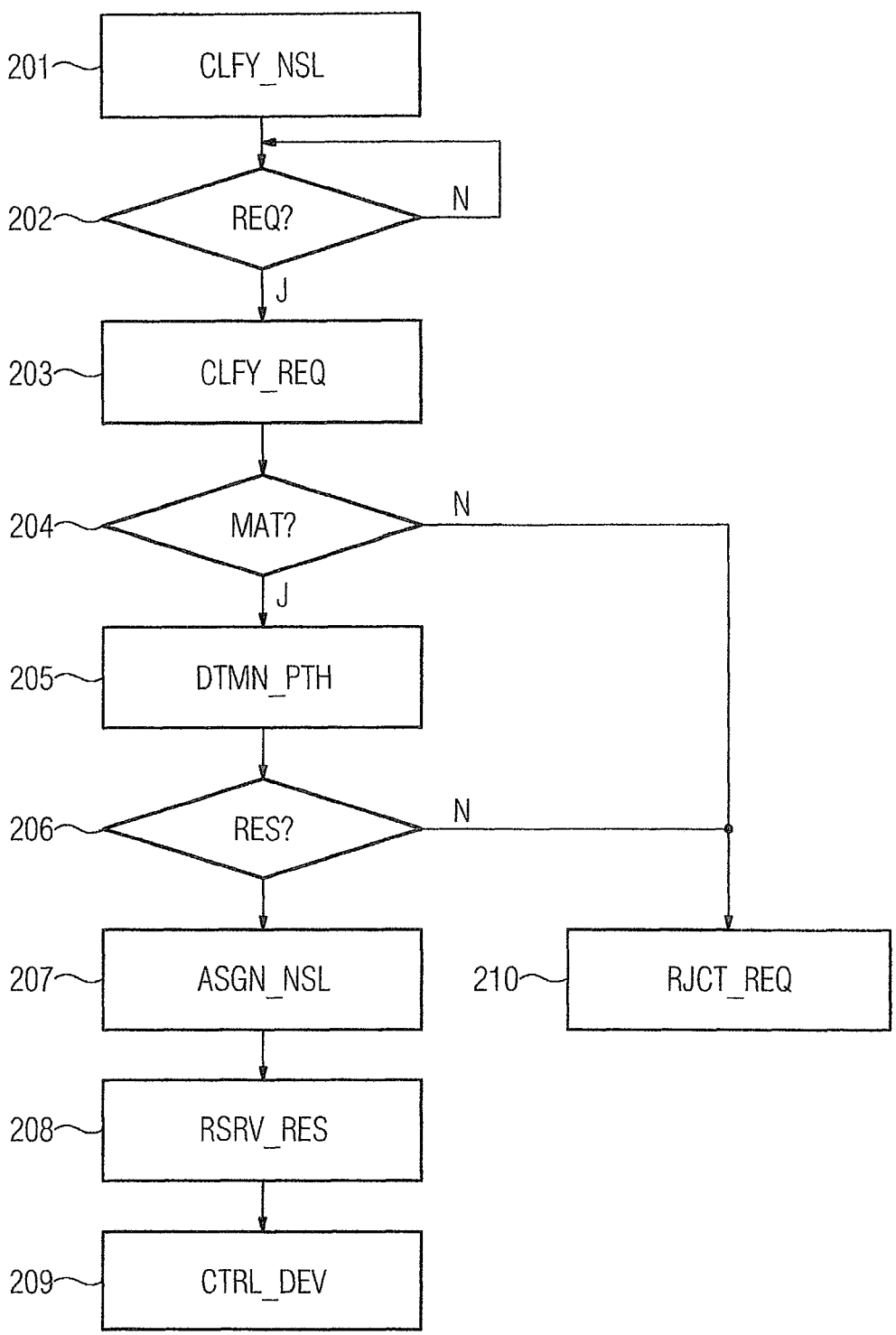

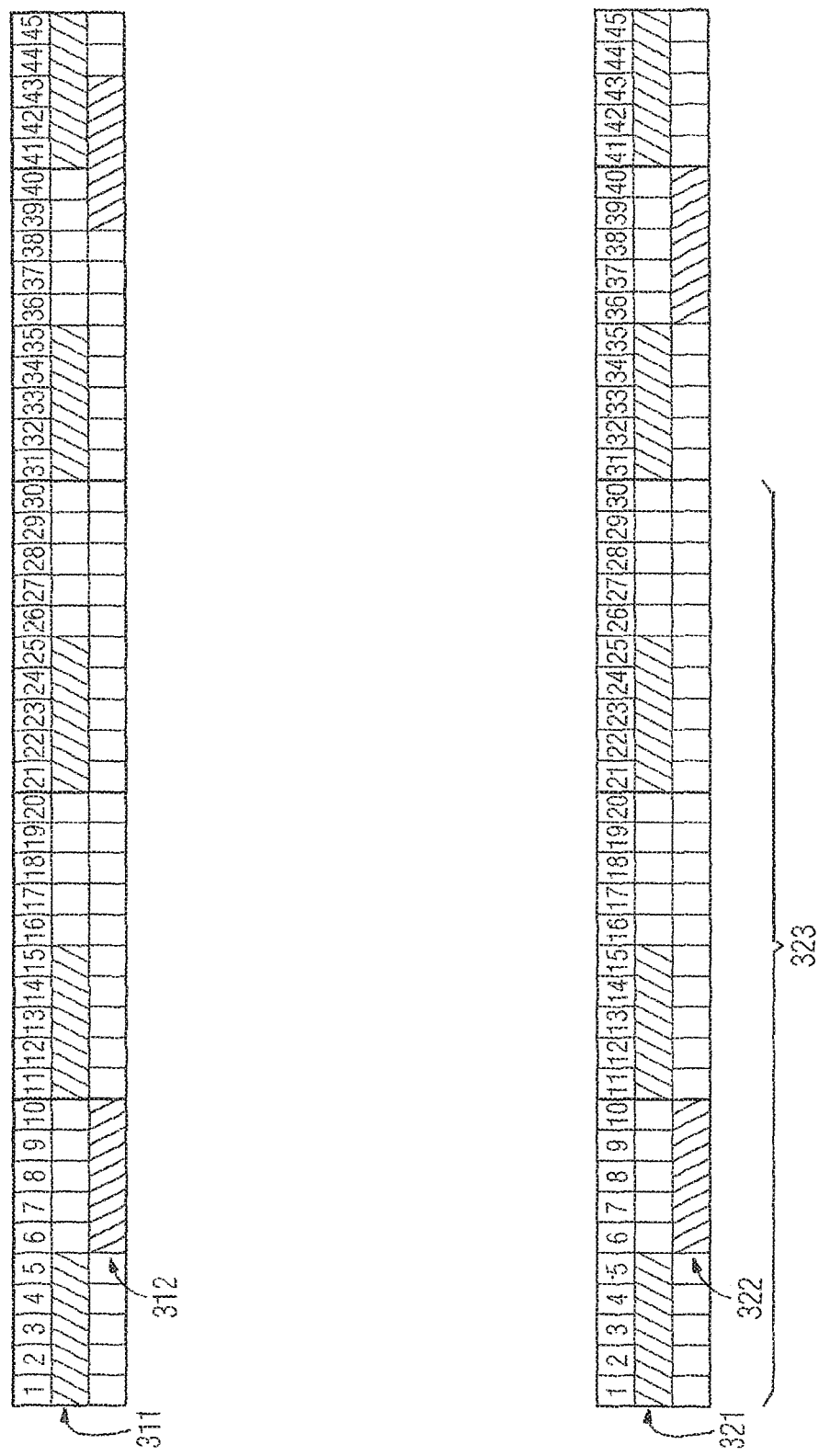

CONTROL UNIT AND METHOD FOR OPERATING AN INDUSTRIAL AUTOMATION SYSTEM COMMUNICATION NETWORK COMPRISING A PLURALITY OF COMMUNICATION DEVICES

CROSS-REFERENCE TO RELATED APPLICATIONS

This is a U.S. national stage of application No. PCT/EP2016/082831 filed Dec. 29, 2016.

BACKGROUND OF THE INVENTION

1. Field of the Invention

The invention relates to industrial automation systems and, more particularly, to a method for operating an industrial automation system communication network comprising a plurality of communication devices, where at least one control unit controls functions of a plurality of assigned communication devices

2. Description of the Related Art

Industrial automation systems are used for monitoring and open-loop and closed-loop control of technical processes, in particular in the field of production automation, process automation and building automation, and allow control equipment, sensors, machines and industrial systems to be operated in a manner that is meant to be, as far as possible, autonomous and independent of human interventions. The ever increasing relevance of information technology to automation systems comprising numerous networked control units and processing units means that even greater importance is attached to methods for reliably providing functions distributed over an automation system that are intended to provide monitoring and open-loop and closed-loop control functions. In industrial automation systems, particular problems regularly result from message traffic containing messages that are relatively large in number but relatively short, thereby amplifying the problems above.

Software defined networking aims to virtualize communication network functions by separating communication devices, such as routers or switches, functionally into components assigned to a control plane and a data plane. The data plane comprises functions and/or components for forwarding data packets and/or data frames. The control plane, in contrast, comprises management functions for controlling the forwarding and/or the components of the data plane. OpenFlow, for example, defines a standard for software-implemented control planes. By abstracting hardware as virtual services, it is possible to dispense with manual configuration of the hardware, in particular by creating programmable central control of network traffic. OpenFlow supports partitioning of system resources into network slices, which partitioning ensures that defined system resources are provided irrespective of other existing network slices.

US 2013/268686 A1 discloses a method for sending a connection establishment request, where an OpenFlow switch sends a message containing a parameter request to a configuration server to obtain connection parameters from an OpenFlow controller. In response to the message containing the parameter request, the OpenFlow switch receives an IP address and a set of OpenFlow connection parameters from the configuration server, where the set of OpenFlow connection parameters comprises at least connection parameters of a first OpenFlow controller. The OpenFlow switch sends a message containing a connection establishment request to the first OpenFlow controller according to the IP address and the set of OpenFlow connection parameters of the first OpenFlow controller. It is thereby possible for a connection between an OpenFlow switch and an OpenFlow controller to be established automatically.

WO 2013/110742 A1 relates to a control unit for providing communication services in a physical communication network. These communication services are used by a plurality of applications running on communication devices, with requirements made of the communication services specified for each of said applications. The control unit generates a communication network model, which represents a topology of the physical communication network and comprises a network node model for each communication device. The network node model describes functions and resources for the associated communication device. In addition, the control unit calculates, for each application running on the communication devices, a virtual communication network by mapping onto the communication network model the requirements made by the particular application of the communication services. The calculated virtual communication networks each comprise at least two network nodes described by a network node model, and a partition or network slice of selected communication network resources provided by the communication devices.

WO 2014/108178 A1 describes a method for connecting a booting switch to a communication network via a central control unit, which communication network comprises a multiplicity of where the controlled by the central control unit. In order to control the switches, the central control unit transmits data packets containing control information for the switches via the same communication paths as data packets containing user data. Each switch comprises a pipeline, in which are stored forwarding rules for data packets and which can be accessed via a local switch port. The communication paths for the data packets containing control information are established by storing forwarding rules defined by the central control unit in the pipelines of the switches. At least one of the switches comprises a selected port, via which the booting switch is connected to the communication network. In order for the central control unit to store forwarding rules in the booting switch, a temporary communication path is used, which comprises a communication path between the selected port and the central control unit, and a communication path between the selected port and a local port of the booting switch. This temporary communication path allows access to the pipeline of the booting switch.

WO 2015/096761 A1 describes data-traffic oriented dynamic zoning for software defined networking (SDN), in which a network component receives control information from an SDN controller of a plurality of SDN controllers. The network component determines available traffic engineering zones, and selects a local zone controller for each determined traffic engineering zone. A master zone controller is selected based on the control information and a zoning scheme, where the master zone controller and the local zone controllers are selected from the SDN controllers. In addition, the network component transmits information about local zone controllers, zone membership and master zone controllers to at least some of the SDN controllers.

For cycle-based control processes in industrial automation systems, where control commands must be transmitted regularly within a predetermined cycle time, the cycle time is used as the time base for periodic data transmission. Owing to a typically rather small volume of data for control commands, the challenges that exist in industrial automation systems lie less in providing sufficient bandwidth for transmitting the control commands but, rather, in reliably guaranteeing a defined time window for transmitting these commands. Time-slice based schedulers, for example, are used for this purpose, via which it is possible to satisfy high requirements relating to latency and jitter. A consistent configuration of time-slice based schedulers is highly complex, however, in particular in industrial automation systems, especially because existing solutions for virtualization of communication networks are aimed solely at bandwidth guarantees.

SUMMARY OF THE INVENTION

It is an object of the present invention to provide a simple and failsafe method for configuring time-based access control for transmit queues in industrial communication devices in the event of path reservation requests, and to define a corresponding control unit for communication devices.

This and other objects and advantages are achieved in accordance with the invention by having a control unit and method for operating an industrial automation system communication network comprising a plurality of communication devices, where at least one control unit controls functions of a plurality of assigned communication devices. Said control unit is assigned to at least one partition of the communication network. Partitions comprise respectively specifiable portions of system resources of assigned communication devices for specifiable resource utilization periods, and are preferably logically disjunct from one another. In addition, the communication devices each comprise at least one transceiver, where each transceiver is assigned a plurality of transmit queues, each of which is granted access to the associated transceiver for a definable access time period within a definable repetition cycle.

The communication devices can be assigned, for example, to a software defined network, which comprises a communication control plane denoted as the control plane, and a data transmission plane denoted as the data plane. Here, the control unit is assigned to the control plane, whereas the communication devices are assigned to the data plane. In particular, the communication devices can comprise routers and/or switches, in which case the control unit can define flow tables, for example, from which are derived routing and/or forwarding tables for communication devices assigned to the control unit. The partitions are preferably network slices, and are specified via an engineering system manually by a system administrator or in an automated manner.

In accordance with the invention, the access time periods and repetition cycles for the transmit queues are set in the assigned communication devices by the control unit according to the resource utilization periods for the partitions. In addition, the partitions are classified according to the access time periods and repetition cycles set in the assigned communication devices. Path reservation requests for data streams are classified correspondingly according to specified access time periods and repetition cycles. Potential partitions for the path reservation requests are determined based on matching classifications of access time periods and repetition cycles. The determined partitions are checked to ascertain whether there are sufficient system resources available for the path reservation request concerned. If the result of the check is positive, then the path reservation request concerned is assigned to at least one determined partition, and system resources required for the path reservation request are reserved within this partition. Simple and reliable configuration of communication network partitions is thereby possible, where the configuration can be adapted flexibly to cycle times in an industrial automation system. It is also possible to rule out any mutual influence between the partitions.

In accordance with an advantageous embodiment of the method in accordance with the invention, the control unit determines communication network paths for each of the path reservation requests, taking into account system resources available in the relevant partition, and controls routing or switching functions of the communication devices according to the determined communication network paths. The control unit preferably determines the communication network paths based on a quality measure. Path costs, for example, can be applied as the quality measure for determining the communication network paths by the control unit.

The control unit can set the transmit queues of the communication devices for data streams having different repetition cycles by determining for the different repetition cycles a smallest common multiple as the total repetition cycle. Here, the different repetition cycles for the transmit queues are embedded in the total repetition cycle at a frequency equal to a quotient of the total repetition cycle and the particular repetition cycle. The access time periods for the respective transmit queues are preferably identical, while the different repetition cycles are each an integer multiple of a fundamental cycle.

In theory, during commissioning of the communication network, the system resources can be assigned to a plurality of control units such that they are partitioned in an equally distributed manner. The partitions are then modified by the control units according to a given resource utilization and/or resource requirement. During commissioning of the communication network, the system resources are preferably partitioned according to known and/or estimated classifications of communication requirements on the part of automation devices to be connected to the communication network. Matching classifications of access time periods and repetition cycles can thereby be expected in the event of path reservation requests. Thus path reservation requests can be accepted without the need to modify partitions.

Control units can each be assigned, for example, to at least one tenant, one user and/or one application. In addition, the path reservation requests can each be initiated by a tenant, a user and/or an application. The access time periods and repetition cycles for the transmit queues of the communication devices are preferably controlled via Time Aware Shaper as defined in Institute of Electrical and Electronic Engineering (IEEE) standard 802.1Qbv.

The control unit in accordance with the invention is intended to perform a method in accordance with the above statements, and is configured to control functions of a plurality of assigned communication devices, and to be assigned to at least one partition of a communication network. The partitions each comprise specifiable portions of system resources of assigned communication devices for specifiable resource utilization periods. In addition, the control unit is configured to set in the assigned communication devices, access time periods and repetition cycles for transmit queues according to the resource utilization periods for the partitions. The communication devices also each comprise at least one transceiver. Each transceiver is assigned a plurality of transmit queues, each of which is granted access to the associated transceiver for a definable access time period within a definable repetition cycle.

In accordance with the invention, the control unit is configured to classify the partitions according to the access time periods and repetition cycles set in the assigned communication devices, and to classify path reservation requests for data streams according to specified access time periods and repetition cycles. Furthermore, the control unit is configured to determine potential partitions for the path reservation requests based on matching classifications of access time periods and repetition cycles, and to check the determined partitions to ascertain whether there are sufficient system resources available for the path reservation request concerned. In addition, the control unit is configured to assign the path reservation request concerned, if the result of the check is positive, to at least one determined partition, and to reserve within this partition, system resources required for the path reservation request.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The present invention is explained in greater detail below from an exemplary embodiment with reference to the drawing, in which:

FIG. 2 shows a flow diagram for reserving system resources by the control units of the communication system shown in FIG. 1;

FIG. 3 shows a schematic diagram of granting data streams having different repetition cycles, access to transmit queues of the communication devices shown in FIG. 1.

DETAILED DESCRIPTION OF THE EXEMPLARY EMBODIMENTS

Figure 1:
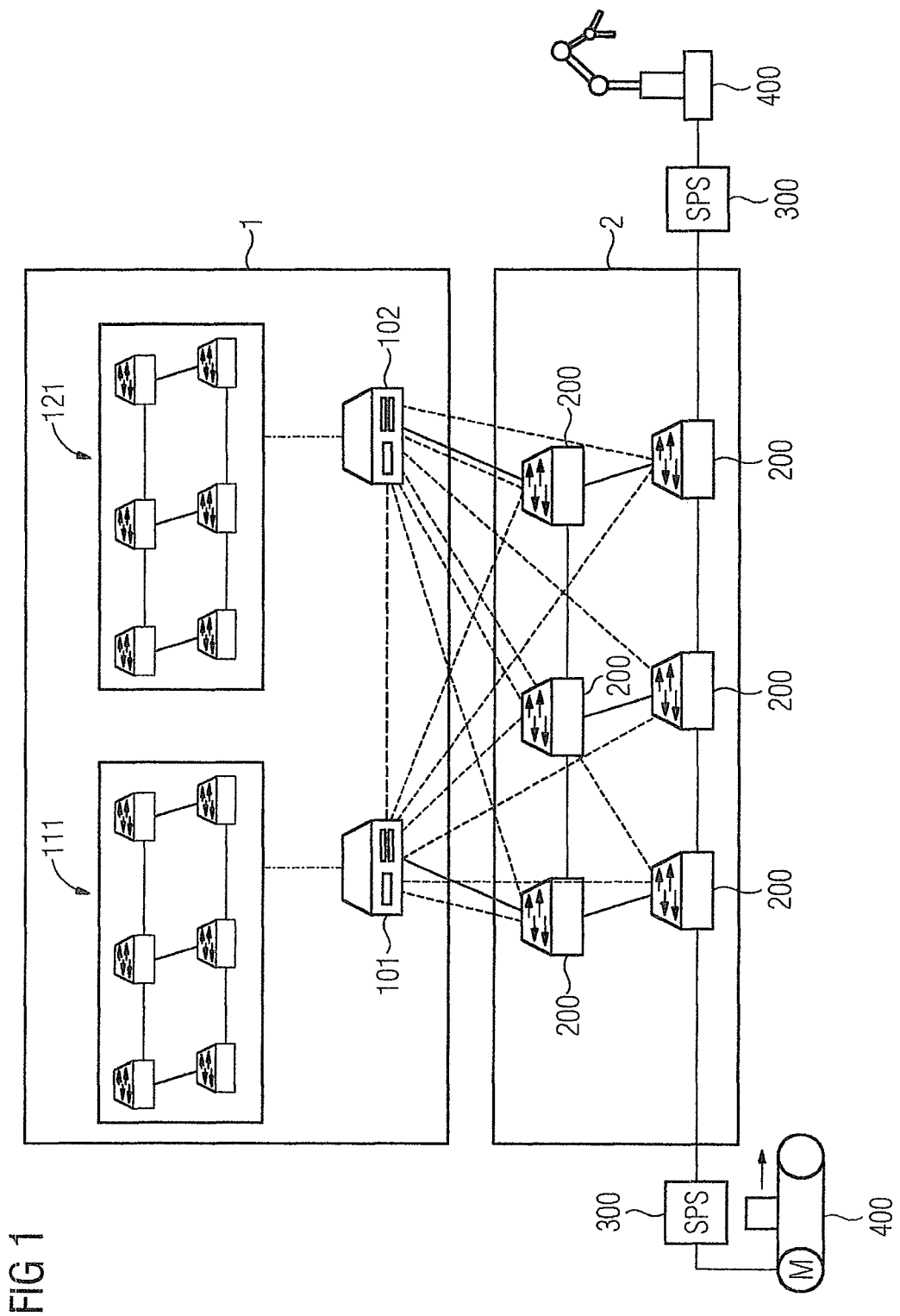
FIG. 1 shows an industrial automation system communication network comprising a plurality of communication devices and control units assigned to these devices in accordance with the invention.

The communication network shown in FIG. 1 of an industrial automation system comprises a plurality of communication devices 200 and a plurality of the control units 101, 102. For example, the communication devices 200 may be switches, routers or firewalls, and may be used for connecting programmable logic controllers 300 or input/output units of the industrial automation system. Programmable logic controllers 300 typically each comprise a communication module, a central processing unit and at least one input/output unit (I/O module), and hence likewise constitute communication devices. In principle, input/output units can also be formed as distributed I/O modules, which are arranged remotely from a programmable logic controller.

A programmable logic controller 300 is connected, for example, to a switch or router or additionally to a fieldbus via the communication module. The input/output unit is used for transferring control quantities and measured quantities between the programmable logic controller 300 and a machine or apparatus 400 controlled by the programmable logic controller 300. The central processing unit is provided in particular for determining suitable control quantities from acquired measured values. The aforementioned components of the programmable logic controller 300 are connected to one another via a backplane system in the present exemplary embodiment.

In the present exemplary embodiment, the communication devices 200 are assigned to a software defined network (SDN), which comprises a communication control plane 1 denoted as the control plane, and a data transmission plane 2 denoted as the data plane. The control units 101, 102 as SDN controllers are assigned to the control plane, whereas the communication devices are assigned to the data plane. The control units 101, 102 define, for example, flow tables for switches or routers, from which are derived routing tables and/or forwarding tables for communication devices 200 assigned to the respective control units 101, 102.

In the present exemplary embodiment, the control units 101, 102 are each assigned to at least one tenant, in particular to a user or to an application. The control units 101, 102 are generally configured to control functions of a plurality of assigned communication devices 200, and are each assigned to a partition of the communication network. In the present exemplary embodiment, the partitions are network slices, and can be specified via an engineering system manually by a system administrator or in an automated manner. In particular, the network slices comprise respectively specifiable portions of system resources of assigned communication devices 200 for specifiable resource utilization periods, where the network slices are preferably logically disjunct from one another. A separate resource view 111, 121 of the portions of system resources that are assigned to the corresponding network slice is preferably provided for each control unit 101, 102.

System resources include, for example, port bandwidth, queue buffers, DHCP address ranges, VLAN identifiers and routing-table entries or forwarding-table entries. In theory, during commissioning of the communication network, the system resources can be assigned to the control units 101, 102 such that they are initially partitioned in an equally distributed manner. The network slices can then be modified by the control units 101, 102 according to a given resource utilization and/or resource requirement. During commissioning of the communication network, the system resources are preferably partitioned according to known and/or estimated classifications of communication requirements on the part the automation devices to be connected to the communication network.

The communication devices 200 comprise at least one transceiver or one port each, where each transceiver or port is assigned a plurality of transmit queues. Each of the transmit queues is granted access to the associated transceiver or the associated port for a definable access time period within a definable repetition cycle. The access time periods and repetition cycles for the transmit queues are set in the assigned communication devices 200 by the control units 101, 102 according to the resource utilization periods for the network slices. The access time periods and repetition cycles for the transmit queues of the communication devices 200 can be controlled, for example, by means of Time Aware Shaper as defined in IEE 802.1Qbv.

In step 201 of the flow diagram shown in FIG. 2 for reserving system resources, the network slices are classified according to the access time periods and repetition cycles set in the assigned communication devices. This can be performed, for example, by an engineering system as part of project planning. In addition, the control units 101, 102 continually monitor, in accordance with step 202, whether path reservation requests exist from tenants, users and/or applications. Existing path reservation requests for data streams are classified (step 203) according to access time periods and repetition cycles specified in the path reservation request concerned. In accordance with step 204, the control units 101, 102 determine based on matching classifications of access time periods and repetition cycles, for the path reservation requests potential network slices within which a path reservation is possible in principle. If there are no matching classifications, the particular path reservation request is rejected, in accordance with step 210. Data streams assigned to rejected path reservation requests can be transmitted, in principle, as best effort data in free timeslots, without maintaining quality guarantees. In addition, it is also possible to reserve specific timeslots for best effort data.

In the case of there being matching classifications, the control units 101, 102 determine, in accordance with step 205, communication network paths for each of the path reservation requests, taking into account system resources available in the particular network slice. For example, the control units 101, 102 determine the communication network paths based on path costs. In addition, the control units 101, 102 are configured to check, in accordance with step 206, the determined network slices to ascertain whether there are sufficient system resources available for the particular path reservation request. If sufficient system resources are not available, the particular path reservation request is rejected, in accordance with step 210. Notification of the rejection can comprise, for example, suggestions for a new reservation request using modified parameters.

If sufficient system resources are available, then the particular path reservation request is assigned, in accordance with step 207, to a determined network slice, and system resources required for the path reservation request are reserved within this network slice (step 208). On this basis, the control units 101, 102 control, in accordance with step 209, routing or switching functions of the communication devices according to the determined communication network paths.

Within a technical process, data streams often have the same repetition cycle. In the case of superimposed or hierarchical closed-loop control systems, however, different repetition cycles can arise that differ significantly from one another. Different repetition cycles make it harder to configure a time-based scheduler for Time Aware Shaper, however. Configuring the scheduler includes specifying all the times at which a gate for a transmit queue is opened or closed. When a gate is open, data can be transmitted out of the transmit queue assigned to the gate concerned. Data from a transmit queue that has a closed gate cannot be transmitted, however.

The control units 101, 102 set the transmit queues of the communication devices 200 for data streams having different repetition cycles by determining for the different repetition cycles a smallest common multiple as the total repetition cycle. Here, the different repetition cycles for the transmit queues are embedded in the total repetition cycle at a frequency equal to a quotient of the total repetition cycle and the particular repetition cycle.

FIG. 3 shows two scenarios, each having two data streams 311-312, 321-322 and different repetition cycles, while the access time period equals 5 ms in each case. According to a first scenario, a first data stream 311 has a repetition cycle of 10 ms, whereas a second data stream 312 has a repetition cycle of 33 ms. A large total repetition cycle of 330 ms not only results in fundamentally poor bandwidth utilization but also creates a problem because gate reservations for the first data stream 311 and for the second data stream 312 would be in conflict from timeslot 41 to timeslot 43 (timeslot length 1 ms in each case) in the first scenario.

As a result, the different repetition cycles are adjusted in a second scenario such that they are each an integer multiple of a fundamental cycle. Although a first data stream 321 again has a repetition cycle of 10 ms in the second scenario, a repetition cycle of 30 ms is selected for a second data stream 322. Thus, in the second scenario, the total repetition cycle 323 can be shortened to 30 ms, and conflicting gate reservations can be avoided. Thus, in the case of different repetition cycles, an adjustment should always be made in accordance with the second scenario.

Thus, while there have been shown, described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for operating an industrial automation system communication network comprising a plurality of communication devices, at least one control unit controlling functions of a plurality of assigned communication devices and being assigned to at least one partition of the communication network, partitions of the communication network comprising respectively specifiable portions of system resources of assigned communication devices for specifiable resource utilization periods, the communication devices each comprising at least one transceiver which is assigned a plurality of transmit queues, each of which is granted access to the associated transceiver for a definable access time period within a definable repetition cycle, and the access time periods and repetition cycles for the transmit queues being set in the assigned communication devices by the control unit according to the resource utilization periods for the partitions, the method comprising:

classifying the partitions according to the access time periods and repetition cycles set in the assigned communication devices;

classifying path reservation requests for data streams according to specified access time periods and repetition cycles;

determining potential partitions for the path reservation requests based on matching classifications of access time periods and repetition cycles;

checking the determined partitions to ascertain whether sufficient system resources are available for a relevant path reservation request; and assigning the relevant path reservation request to at least one determined partition, and reserving system resources required for the relevant path reservation request within the determined partition when sufficient system resources are available for the relevant path reservation request.

2. The method as claimed in claim 1, wherein the control unit determines communication network paths for each of the path reservation requests, taking into account system resources available in the relevant partition, and controls routing or switching functions of the communication devices according to the determined communication network paths.

3. The method as claimed in claim 2, wherein the control unit determines the communication network paths based on a quality measure.

4. The method as claimed in claim 3, wherein path costs are applied by the control unit as the quality measure for determining the communication network paths.

5. The method as claimed in claim 1, wherein the control unit sets the transmit queues of the communication devices for data streams having different repetition cycles by determining for different repetition cycles a smallest common multiple as the total repetition cycle; wherein the different repetition cycles for the transmit queues are embedded in the total repetition cycle at a frequency equal to a quotient of the total repetition cycle and a particular repetition cycle; and wherein the access time periods for the respective transmit queues are identical, and the different repetition cycles are each an integer multiple of a fundamental cycle.

6. The method as claimed in claim 1, wherein the communication devices are assigned to a software defined network which comprises a communication control plane denoted as the control plane and a data transmission plane denoted as the data plane; wherein the control unit is assigned to the control plane; and wherein the communication devices are assigned to the data plane.

7. The method as claimed in claim 6, wherein the partitions are network slices which are specified via an engineering system manually by a system administrator or specified in an automated manner.

8. The method as claimed in claim 7, wherein during commissioning of the communication network, the system resources are assigned to a plurality of control units such that said system resources are partitioned in an equally distributed manner; and wherein the partitions are subsequently modified by the control units according to at least one of (i) a specific resource utilization and (ii) a resource requirement.

9. The method as claimed in either claim 7, wherein during commissioning of the communication network, the system resources are partitioned according to at least one of (i) known and (ii) estimated classifications of communication requirements with respect to automation devices to be connected to the communication network.

10. The method as claimed in claim 7, wherein the network slices are logically disjunct from one another.

11. The method as claimed in claim 6, wherein during commissioning of the communication network, the system resources are assigned to a plurality of control units such that said system resources are partitioned in an equally distributed manner; and wherein the partitions are subsequently modified by the control units according to at least one of (i) a specific resource utilization and (ii) a resource requirement.

12. The method as claimed in either claim 6, wherein during commissioning of the communication network, the system resources are partitioned according to at least one of (i) known and (ii) estimated classifications of communication requirements with respect to automation devices to be connected to the communication network.

13. The method as claimed in claim 6, wherein the communication devices comprise at least one of (i) routers and (ii) switches, and wherein the control unit defines flow tables, from which at least one of (ii) routing tables and (ii) forwarding tables for communication devices assigned to the control unit are derived.

14. The method as claimed in claim 1, wherein at least one of (A) control units are each assigned to at least one of (i) at least one tenant, (ii) one user and (iii) one application and (B) wherein the path reservation requests are each initiated by a at least one of (i) tenant, (ii) a user and (iii) an application.

15. The method as claimed in claim 1, wherein the access time periods and repetition cycles for the transmit queues of the communication devices are controlled via Time Aware Shaper as defined in Institute of Electrical and Electronics Engineers (IEEE) standard 802.1Qbv.

16. A control unit comprising:
a processor; and
memory;
the control unit being configured to:
control functions of a plurality of assigned communication devices, and to be assigned to at least one partition of a communication network, partitions of the communication network each comprising specifiable portions of system resources of assigned communication devices for specifiable resource utilization periods,
set in the assigned communication devices, access time periods and repetition cycles for transmit queues according to the resource utilization periods for the partitions, said communication devices each comprising at least one transceiver, and each transceiver being assigned a plurality of transmit queues, each of which is granted access to the associated transceiver for a definable access time period within a definable repetition cycle,
classify the partitions according to the access time periods and repetition cycles set in the assigned communication devices,
classify path reservation requests for data streams according to specified access time periods and repetition cycles,
determine potential partitions for the path reservation requests based on matching classifications of access time periods and repetition cycles,
check the determined partitions to ascertain whether sufficient system resources are available for a relevant path reservation request,
assign the relevant path reservation request concerned to at least one determined partition and, reserve within this partition, system resources required for the path reservation request when sufficient system resources are available for the relevant path reservation request.

* * * * *